United States Patent
Weber et al.

(10) Patent No.: US 11,687,440 B2
(45) Date of Patent: Jun. 27, 2023

(54) METHOD AND DEVICE OF PROTECTING A FIRST SOFTWARE APPLICATION TO GENERATE A PROTECTED SOFTWARE APPLICATION

(71) Applicant: THALES DIS CPL USA, INC, Austin, TX (US)

(72) Inventors: Andreas Weber, Poing (DE); David Andreas Lange, Fürstenfeldbruck (DE); Michael Zunke, Kirchheim (DE)

(73) Assignee: THALES DIS CPL USA, INC., Austin, TX (US)

( * ) Notice: Subject to any disclaimer, the term of this patent is extended or adjusted under 35 U.S.C. 154(b) by 0 days.

(21) Appl. No.: 17/165,480

(22) Filed: Feb. 2, 2021

(65) Prior Publication Data
US 2022/0245052 A1    Aug. 4, 2022

(51) Int. Cl.
| | |
|---|---|
| G06F 9/44 | (2018.01) |
| G06F 11/36 | (2006.01) |
| G06F 8/41 | (2018.01) |
| G06F 8/77 | (2018.01) |

(52) U.S. Cl.
CPC .......... G06F 11/3604 (2013.01); G06F 8/433 (2013.01); G06F 8/437 (2013.01); G06F 8/443 (2013.01); G06F 8/77 (2013.01); G06F 11/3668 (2013.01)

(58) Field of Classification Search
CPC ........... G06F 21/14; G06F 21/52; G06F 21/54
USPC .......................................................... 717/124
See application file for complete search history.

(56) References Cited

U.S. PATENT DOCUMENTS

| | | | | |
|---|---|---|---|---|
| 7,716,459 B2 * | 5/2010 | Elias | ............... | G06F 21/755 |
| | | | | 712/234 |
| 8,056,138 B2 * | 11/2011 | Jin | ................. | G06F 21/125 |
| | | | | 726/26 |
| 8,195,953 B1 * | 6/2012 | Yue | ................. | G06F 21/566 |
| | | | | 726/22 |

(Continued)

OTHER PUBLICATIONS

Jacob Kreindl et al. "Towards Efficient, Multi-Language Dynamic Taint Analysis"; MPLR '19, Oct. 21-22, 2019, Athens, Greece.*

(Continued)

*Primary Examiner* — Francisco J Aponte

(57) ABSTRACT

Protection of a first software application to be executed on an execution platform by adding at least one check module to the software application, wherein the check module, when being executed, checks at least a part of the code of the protected software application loaded in the memory and carries out a predefined tamper response in case the check module detects that the checked code was changed or ensures that the protected software application continues to function correctly in case the check module detects that the checked code was not changed; selecting a first code region of the first software application, said first code region provides a first functionality when being executed; amending the selected first code region of the first software application such that an amended first code region is generated to provide the protected software application; wherein the amended first code region, when being executed, still provides the first functionality but carries out an access to at least a part of the code of a protected software application loaded in the memory for providing the first functionality.

15 Claims, 2 Drawing Sheets

(56) References Cited

U.S. PATENT DOCUMENTS

| | | | |
|---|---|---|---|
| 8,302,188 B2* | 10/2012 | Sato | G06F 21/54 726/22 |
| 8,843,761 B2* | 9/2014 | Meyer | G06F 21/54 713/187 |
| 8,874,928 B2* | 10/2014 | Betouin | G06F 8/427 713/189 |
| 9,177,153 B1* | 11/2015 | Perrig | G06F 21/57 |
| 9,454,659 B1* | 9/2016 | Daymont | G06F 21/566 |
| 9,471,758 B2* | 10/2016 | Salmon-Legagneur | G06F 21/14 |
| 9,607,147 B2* | 3/2017 | Chen | G06F 21/554 |
| 9,824,214 B2* | 11/2017 | Daymont | G06F 11/362 |
| 10,152,600 B2* | 12/2018 | Rozas | G06F 21/57 |
| 10,176,324 B2* | 1/2019 | Davidson | G06F 21/57 |
| 10,228,929 B2* | 3/2019 | El-Moussa | G06F 8/65 |
| 10,402,547 B2* | 9/2019 | Joseph Johnson | G06F 21/125 |
| 10,411,896 B2* | 9/2019 | Bouterse | G06F 21/64 |
| 10,489,564 B2* | 11/2019 | Aschauer | G06F 9/44589 |
| 10,613,993 B2* | 4/2020 | Fel | G06F 12/1408 |
| 10,803,151 B2* | 10/2020 | Stewart | G06F 21/125 |
| 11,086,997 B1* | 8/2021 | Stephenson | G06F 21/64 |
| 11,250,110 B2* | 2/2022 | Garreau | G06F 21/125 |
| 11,256,786 B2* | 2/2022 | Garreau | G06F 21/14 |
| 11,269,988 B2* | 3/2022 | Bogaert | G06F 11/28 |
| 11,307,850 B2* | 4/2022 | Murray | G06F 16/2272 |
| 11,392,700 B1* | 7/2022 | Beard | G06F 21/57 |
| 2006/0195703 A1* | 8/2006 | Jakubowski | G06F 21/14 713/190 |
| 2010/0180346 A1* | 7/2010 | Nicolson | G06F 21/14 726/26 |
| 2013/0232323 A1* | 9/2013 | Lerouge | G06F 21/14 712/E9.045 |
| 2013/0232507 A1* | 9/2013 | Farrugia | G06F 21/52 719/313 |
| 2014/0020112 A1* | 1/2014 | Goodes | G06F 9/5016 726/26 |
| 2016/0094564 A1* | 3/2016 | Mohandas | G06F 21/563 726/24 |
| 2016/0378987 A1* | 12/2016 | Ferrara | H04L 63/20 726/1 |
| 2017/0337047 A1* | 11/2017 | Shrivastava | G06F 9/3005 |
| 2018/0268130 A1* | 9/2018 | Ghosh | G06F 21/53 |
| 2019/0205528 A1* | 7/2019 | Bogaert | G06F 21/52 |
| 2020/0057856 A1* | 2/2020 | Daymont | G06F 11/3612 |
| 2020/0065480 A1* | 2/2020 | Gu | G06F 21/64 |
| 2020/0372129 A1* | 11/2020 | Gupta | G06F 9/3842 |
| 2021/0303661 A1* | 9/2021 | Peng | G06F 21/125 |

OTHER PUBLICATIONS

Jonathon T. Giffin et al. "Strengthening Software Self-Checksumming via Self-Modifying Code"; Computer Sciences Department University of Wisconsin—Proceedings of the 21st Annual Computer Security Applications Conference (ACSAC 2005).*

* cited by examiner

METHOD AND DEVICE OF PROTECTING A FIRST SOFTWARE APPLICATION TO GENERATE A PROTECTED SOFTWARE APPLICATION

BACKGROUND

The present invention relates to a method and a device of protecting a first software application to generate a protected software application.

A state-of-the-art approach to protect a program in-memory against malicious modification (e.g., removing of a license check) is known as dynamic self-checksumming. The idea is that a protected program inspects at runtime its own instruction stream and computes some sort of checksum or hash from it. Additionally, the protected program also contains some logic that ensures that the program only continuous to function correctly when the computed checksum matches its expected value. Code that does both, computing the checksum of the specific memory region and triggering some action if the computed checksum does not match its expected value can be called "checker" or "check module".

However, if an attacker simply disarms a specific checker by locally patching it (e.g., updating its expected checksum or disabling its introspection code) the desired protection can be overcome.

Therefore, there is a need to provide a method for generating a protected software application which provides a better protection against in-memory modifications.

SUMMARY

The invention is defined by the independent claims 1, 14 and 15. Further developments over the invention are given in the dependent claims.

By providing the amended first code region the protected software application does regularly read its instruction stream as part of its normal operation. This obstructs the detection of a check module using dynamic taint analysis because the fact that some code reads the instruction stream is not sufficient anymore to classify the code as being a check module.

The device for protecting a first software application can comprise the same feature as the inventive method for protecting a first software application (including all further embodiments of the inventive method).

It goes without saying that the features mentioned above and so yet to be explained below are usable not only in the combinations specified but also in other combinations or on their own, without departing from the scope of the present invention.

DETAILED DESCRIPTION

Figure 1:
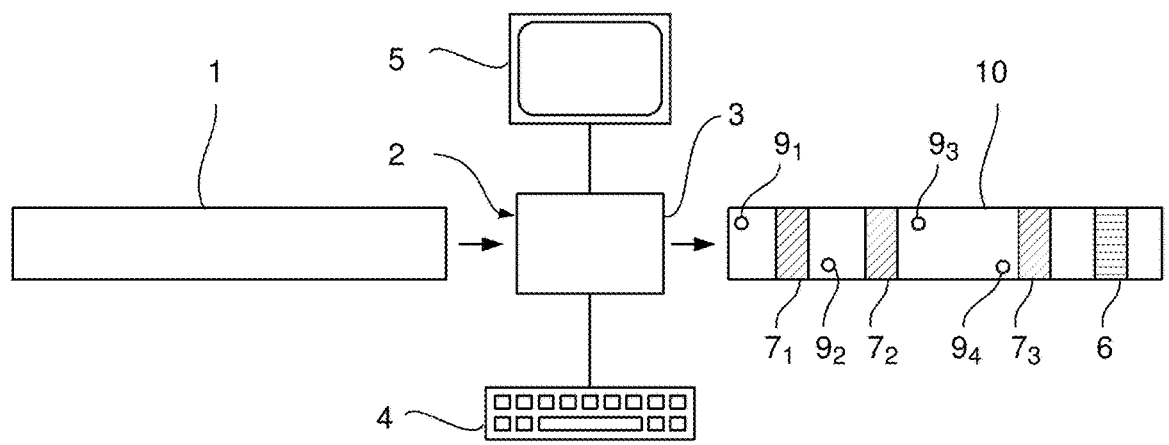
FIG. 1 schematically shows the steps for generating the protected software application.

In the following text, the invention is explained in more detail on the basis of exemplary embodiments with the reference to the appended drawings, which likewise disclose features which are essential to the invention. These exemplary embodiments serve merely for illustration and should not be interpreted as limiting. For example, the description of an embodiment having a large number of elements or components should not be interpreted as meaning that all of these elements or components are necessary for implementation. Rather, other embodiments can also contain alternative elements and components, further elements or components, or additional elements or components. Elements or components of different embodiments can be combined with one another, unless specified otherwise. Modifications and alterations that are described for one of the embodiments can also be applicable to other embodiments. In order to avoid repetitions, identical or mutually corresponding elements in different figures are provided with the same reference signs and not explained several times.

In the following will be described a first embodiment of the computer-implemented method according to the invention for protecting a first software application to generate a protected software application.

The first software application to be protected is supplied to a first computer 2 which comprises a first computing module 3 (including, e.g. a processor, a hard disk, further hardware elements as well as an operating system), a first input unit 4 (in this case, a keyboard, for example) as well as a first output unit 5 (e.g. a screen).

The first computer 2 adds a protection module 6, and three check modules $7_1$, $7_2$, $7_3$ to the first software application 1. In addition, the first computer 2 selects a first code region of the first software application 1 (the first code region provides a first functionality when being executed) and amends that first code region such that an amended first code region $9_1$ is generated. In the same way a second, third and fourth code regions of the first software application are selected and amended such that an amended second, third and fourth code regions $9_2$, $9_3$ and $9_4$ are generated, respectively.

In this way, the protected software application 10 is generated.

Figure 2:
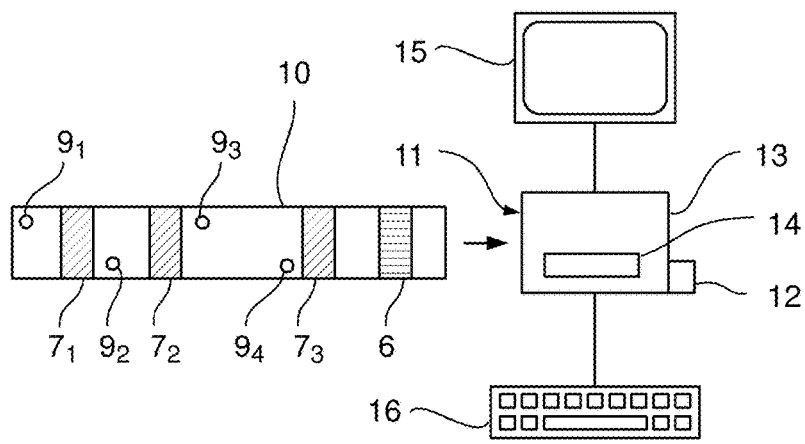
FIG. 2 schematically shows an execution platform for executing the protected software application, and FIG. 3 schematically shows a part of the protected software application loaded in the working memory of the execution platform shown in FIG. 2.

The protected software application 10 can be executed on an execution platform 11 only if a predetermined license is present. In such an execution platform 11 shown in FIG. 2, the presence of the license can be verified, for example by means of a protection unit 12 which is part of the execution platform 11 (as shown) or which is connected to the execution platform 11, respectively. The execution platform 11 further comprises a second computing unit 13 (comprising a processor, a working memory 14 and other hardware elements, including an operating system), a second output unit 15 in the form of a screen as well as a keyboard 16 as a second input unit. The execution platform 11 is preferably a different system than the first computer 2, by which the protected software application 10 is generated from the first software application 1.

When the protected software application 10 is to be executed on the execution platform 11, the protection unit 12 carries out a license verification. The protection unit 12 allows execution of the protected software application 1 only in the presence of a license.

During execution of the protected software application 10 on the execution platform 11 there is provided protection against detecting the check modules $7_1$-$7_3$ using dynamic taint analysis.

Figure 3:
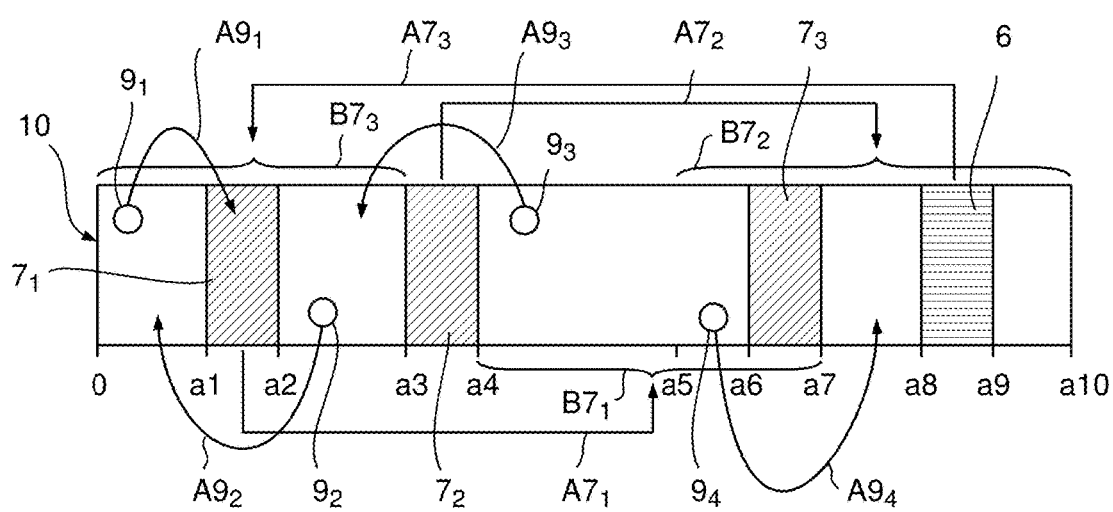

FIG. 3 shows a part of the protected software application 10 loaded in the working memory 14 of the execution platform 11. As already described, a state-of-the-art approach to protect a software application in-memory against malicious modification (e.g., removing of the protection module 6 for license check) is known as dynamic self-checksumming. The idea is that the protected program inspects at runtime its own instruction stream and computes some sort of checksum or hash from it. Additionally, the protected program also contains some logic that ensures that the program only continues to function correctly when the computed checksum matches its expected value.

Code that does both, computing the checksum of a specific memory region and triggering some action if the computed checksum does not match its expected value can be called check module or checker.

As can be seen in FIG. 3, the first check module $7_1$ is code that calculates a checksum from program offset a4 to program offset a7 and compares the result to a first expected value, which is part of the first check module $7_1$ and which at runtime is a constant part of the first check module $7_1$ (cf. arrow $A7_1$ and bracket $B7_1$). At runtime tampering is detected when the calculated value does not match the expected value.

Further, the second check module $7_2$ includes code that calculates a checksum from program offset a5 to program offset a10 and compares the result to the expected value, which is part of the second check module $7_2$ and which at runtime is a constant. At runtime tampering is detected when the calculated value does not match the expected value (cf. arrow $A7_2$ and bracket $B7_2$).

The third check module $7_3$ includes code that calculates a checksum from program offset 0 to program offset a3 (cf. arrow $A7_3$ and bracket $B7_3$). At runtime tampering is detected when the calculated value does not match the expected value, which is part of the third check module $7_3$.

As can be seen, the check modules $7_1$-$7_3$ are placed in an overlapping way, so that an attacker cannot simply disarm a specific checker $7_1$-$7_3$ by locally patching it (e.g. updating its expected checksum or disabling its introspection code) but instead is forced to disarm all check modules $7_1$-$7_3$ at once because the attacked check module is also protected by some other check module which is itself protected by another check module and so forth. This overlapping placement where check modules $7_1$-$7_3$ protect other check modules $7_1$-$7_3$ is referred as checker-graph.

However, the dynamic taint analysis is a dynamic analysis technique that tracks the information-flow through a program's execution and can be used to detect checkers $7_1$-$7_3$ by their behavior. The technique exploits the fact that checkers $7_1$-$7_3$ behave differently than regular application code as they inspect at runtime the program's instruction stream from working memory 14 and based on the observed instructions influence the program's behavior. This is something regular applications do not do because they have no reason to do so and regular applications are usually written in some high-level programing language, which means their actual in-memory instruction stream is unknown at the source level because the instruction stream is only created later by the compiler when it translates the high-level program into machine code.

According to the invention, the amended code regions $9_1$-$9_4$ are generated in the protected software application 10 which, when being executed, carry out access to at least a part of the code of a protected software application 10 stored in the working memory 14 (as indicated by arrows $A9_1$, $A9_2$, $A9_3$ and $A9_4$) for providing the first, second, third and fourth functionality of the respective first to fourth code region of the first software application 1. Therefore, each of the amended code regions $9_1$-$9_4$ (e.g. the amended second code region $9_2$), when being executed, still provides the functionality of the selected code region (e.g. the second code region) but carries out access to code of the protected software application 10 stored in the working memory 14 for doing this. The accessed code can be unamended code (arrows $A9_2$, $A9_3$ and $A9_4$) compared to the first software application 10 or amended or added code (arrow $A9_1$) compared with the first software application 1. Therefore, the regular application code (i.e. code which is not part of a check module $7_1$-$7_3$ or of the protection module 6) does heavily inspect its own instruction stream as part of its program logic. This means that even without any artificially added check module $7_1$-$7_3$ or protection module 6, the compiled application does regularly read its instruction stream as part of its normal operation. Since the protected software application 10 includes the check modules $7_1$-$7_3$ and the amended code regions $9_1$-$9_4$ not only the artificially added check modules $7_1$-$7_3$ inspect the instruction stream but also the rest of the application. This obstructs check module detection using a dynamic taint analysis because the fact that some code reads the instruction stream is not sufficient anymore to classify the code as being a check module.

Of course, it is possible not to add the protection module 6 to the first software application 1 to generate the protected software application 10. Even in this embodiment the protected software application 10 obstructs the check modules $7_1$-$7_9$ from being detected by a dynamic taint analysis.

Two components can be provided to do the rewriting of the application code of the first software application 1 to generate the amended code regions $9_1$-$9_4$: The first component extends the code generation pipeline of the compiler (e.g. LLVM, gcc, etc.). The second component is a tool that applies patches to the binary image (exe/dll) produced by the linker. In the following description the name "compiler-plugin" refers to the first component, the name "post-linker-tool" refers to the second component. The first component can carry out a transformation phase and the second component can carry out a separate reference replace phase.

The job of the compiler-plugin is to replace all uses of constants in the application code (e.g., a C program) of the first software application 1 with a sequence of reads from extern global variables. Thereby a larger constant, e.g. a 32 bit integer should be split into a sequence of smaller reads that create the final value in some variable (can be both, local or global). Also the names of the referenced extern globals encode their desired value.

```
Example: Something like
if( var == 0xBEEFBEEF )
{
  ...
}
Would be rewritten by the compiler-plugin into something like this:
extern uint8_t g_uint8_be_1;
extern uint8_t g_uint8_ef_1;
extern uint8_t g_uint8_be_2;
extern uint8_t g_uint8_ef_2;
uint32_t my_const1;
uint8_t* ptr = (uint8_t*)&my_const1;
ptr[3] = g_uint8_be_1; //Reverse order because of little endian.
ptr[2] = g_uint8_ef_1;
ptr[1] = g_uint8_be_2;
ptr[0] = g_uint8_ef_2;
if( var == my_const1 )
{
  ...
}
```

Here the C-Code is used to illustrate the idea, the actual compiler-plugin would not rewrite actual C-Code but (possibly optimized) intermediate code of the compiler (e.g., LLVM-IR).

Note that because we use extern global variables and e.g., not simply dummy values we get the guarantee that the compiler really generates four 8 bit reads in the object file as the compiler's optimizer only sees 4 references to 4 distinct 8 bit-wide undefined symbols. E.g., the optimizer cannot know that g_uint8_be_1 and g_uint8_be_2 are really constants and that they will have an identical runtime value of 0xBE. Also, because the compiler only sees undefined symbols for the global variables he has to create relocations for the four load instructions. These relocations then enable the post-link tool to patch the linked binary image (exe/dll) so that the load instructions will load their target-values from the program code. The point of splitting larger constants into a sequence of smaller reads increases the odds that the post-linker-tool finds the required values somewhere inside the program code. In order to ensure that the program code of the linked binary image (exe/dll) will contain all necessary constants the compiler-plugin can additionally insert the values via inline assembler such as in the following code:

```
_asm_(
    "jmp skip_data\n"
    ".byte 0xde, 0xad, 0xbe, 0xef\n"
    "skip_data:\n"
);
```

This code can be placed in a C-function and inserts the bytes 0xDE, 0xAD, 0xBE, 0xEF inside the machine code of that function while not interfering with the regular execution as the unconditional jmp instruction jumps over the inserted data. Thereby the compiler-plugin could follow different strategies, e.g., make sure all 255 bytes values are somewhere present in the binary image or just add the values that are actually needed by the rewritten code so that the post-linker-tool will definitely find at least one occurrence.

```
In actual application code constants are pretty common, e.g.,
C-Code like for( int i = 0; i < length; i++ )
{
...
}
would be rewritten into something like
extern uint8_t g_uint8_00_1;
extern uint8_t g_uint8_00_2;
extern uint8_t g_uint8_00_3;
extern uint8_t g_uint8_00_4;
uint32_t my_const2;
uint8_t* ptr2 = (uint8_t*)&my_const2;
ptr[3] = g_uint8_00_1;
ptr[2] = g_uint8_00_2;
ptr[1] = g_uint8_00_3;
ptr[0] = g_uint8_00_4;
for( int i = my_const2; i < length; i++ )
{
...
}
As zero/NULL is probably the most common constant in actual
application code, one code easily apply some encoding that maps
zero/NULL to something else (here 0xBEEF), e.g. C-Code like
int a = 0;
would 1st be rewritten into, e.g. a simple xor encoding
int a = 0xBEEF ^ 0xBEEF //A constant xor with itself yields 0.
and then in a 2nd step the newly created constant(s) (here 0xBEEF
and 0xBEEF) into something like
extern uint8_t g_uint8_be_3;
extern uint8_t g_uint8_ef_3;
```

```
extern uint8_t g_uint8_be_4;
extern uint8_t g_uint8_ef_4;
uint16_t my_const3;
uint16_t my_const4;
uint8_t* ptr3 = (uint8_t*)&my_const3;
uint8_t* ptr4 = (uint8_t*)&my_const4;
ptr3[1] = g_uint8_be_3;
ptr3[0] = g_uint8_ef_3;
ptr4[1] = g_uint8_be_4;
ptr4[0] = g_uint8_ef_4;
int a = my_const3 ^ my_const4;
```

Another common source of constants in application code is the sizeof operator, e.g. code like:
customType* dyn_array=malloc(sizeof(customType) * elemCount);
In this code sizeof(customType) returns the size in bytes of customType which is just a simple compile time constant whose value is directly available at the compiler's intermediate representation. For the sake of this example we assume sizeof(customType) returns 24 (aka 0x18).

```
So at the level of the compiler's intermediate representation the call
looks like customType* dyn_array = malloc( 24 * elemCount );
which would be rewritten into something like
uint8_t my_const5 = g_uint8_18_1;
customType* dyn_array = malloc( my_const5 * elemCount );
```

Another very common source of constants are string literals such as: puts("Hello");
This would be rewritten into something like:
uint8_t my_const6[6]; //sizeof("Hello") is 6 because of the '0'.
my_const6[0]=g_uint8_48_1; //0x48 is 'H'
my_const6[1]=g_uint8_65_1; //0x65 is 'e'
my_const6[2]=g_uint8_6c_1; //0x6C is 'l'
my_const6[3]=g_uint8_6c_2; //0x6C is 'l'
my_const6[4]=g_uint8_6f_2; //0x6f is 'o'
my_const6[5]=g_uint8_00_2; //0x6f is '\0'
puts(my_const6);

A different source of constants are constants not defined by the programmer but by the compiler, e.g., an address calculation to access a specific field of a struct. For performance reasons usual compilers try to encode such constants directly as an immediate of the machine instruction. The compiler-plugin can also extend the compiler backend and modify the instruction selection to use explicit register loads instead of immediates.

Example: The backend requests an instruction that loads a given CPU register with a 32 bit constant, e.g., on x86_64: Load register eax with value 0xBEEFBEEF. A decent x86_64 instruction selector would emit
    mov eax, 0xbeefbeef
The instruction selector provided by the compiler-plugin would emit instead something like this:

```
lea rax, [rip+my_constant] #load address of label 'my_constant' into rax.
mov eax, DWORD PTR [rax] #load 0xbeefbeef into eax.
jmp skip_data   #make sure we are not executing the constant as code.
my_constant:
.4byte 0xbeefbeef
skip_data:
```

This code performs an explicit, program-counter (register rip) relative load of the constant 0xbeefbeef (labeled 'my_constant') which is placed inside the program code.

Similar to the previously described code rewrites the compiler-plugin could also split the rip-relative load of the constant into a sequence of smaller (e.g. byte) loads from different addresses and emit the necessary relocations, so that the post-link-tool can find the necessary somewhere in the program code and then adjust the offsets of the rip-relative loads accordingly.

The job of the post-link-tool is to resolve the symbols originating from the rewriting (the g_<type>_<target_value>_<id>symbols) against existing data values already present in the linked binary image of the exe/dll. So when building the application the regular linker first creates as usual the binary image (exe/dll) by linking the object files together but ignores errors from undefined symbols that originate from the rewriting. In a second step the post-link-tool resolves these undefined symbols against values from the binary image. E.g. to resolve the symbol g_uint8_48_1 the post-link-tool scans the binary image for an occurrence of the byte 0×48, determines the load-address of this value and resolves the associated relocation with the determined load-address. In case of a non-ASLR executables the relocation can be removed, for dlls and ASLR-enabled executables the existing relocation will be replaced with an associated base-relocation ("add runtime base address to relocation-target"). Note that the post-link-tool is not necessarily a separate executable but might be also integrated into the linker. The important aspect is that it runs at the end of the link when the binary image itself is already constructed.

The invention claimed is:

1. A method of protecting a first software application to generate a protected software application to be executed on an execution platform having a memory in which code of the protected software application is loaded for execution, the method comprising:
  adding at least two check modules to the first software application, wherein a first check module of the at least two check modules, when being executed, checks at least a first part of the code of the protected software application loaded in the memory and carries out a predefined tamper response in case the first check module detects that the checked first part of the code was changed or ensures that the protected software application continues to function correctly in case the check module detects that the checked first part of the code was not changed and wherein a second check module of the at least two check modules, when being executed, checks at least a second part of the code of the protected software application loaded in the memory and carries out a predefined tamper response in case the second check module detects that the checked second part of the code was changed or ensures that the protected software application continues to function correctly in case the check module detects that the checked second part of the code was not changed wherein the first part of the code checked by the first check module includes the second check module such that when the first check module is executed the first check module verifies the second check module;
  selecting a first code region of the first software application, said first code region provides a first functionality when being executed; and
  compiling the first software application to provide the protected software application including amending, during compilation, the selected first code region of the first software application such that an amended first code region is generated to carry out access by the selected first code region to a part of code of the protected software application when the protected software application is loaded in the memory;
  wherein the amended first code region, when being executed, still provides the first functionality but carries out an access to at least a part of the code of a protected software application loaded in the memory for providing the first functionality.

2. The method according to claim 1, wherein amending the selected first code region comprises:
  a) at least one transformation phase transforming a defined constant value within the selected first code region into a code fragment retrieving the value, wherein
    the value comes from a reference which is undefined at transformation time or
    the value is based on one or more derived values retrieved from references which are undefined at transformation time, and
  b) a separate reference replace phase that replaces the formerly undefined references introduced by step a) by defined references pointing to a suitable value somewhere present in the software code itself.

3. The method according to claim 2, wherein the transformation phase splits large constants into a combination of smaller-sized date retrievals.

4. The method according to claim 2, wherein the transformation phase declares the undefined references as distinct extern global variables.

5. The method according to claim 2, wherein the transformation phase encodes the desired value into the name of the undefined reference.

6. The method according to claim 2, wherein the transformation phase inserts constants into the code to ensure the replace phase will succeed finding the desired values inside the code.

7. The method according to claim 2, wherein the reference replace phase replaces undefined references against defined references pointing to one or more opcode bytes of the software code.

8. The method according to claim 2, wherein amending the first code region replaces constants by equivalent expressions containing a combination of other constants.

9. The method according to claim 2, wherein selecting a first code region and amending the selected first code region is performed at the level of source code, at the level of compiler intermediate code and/or at the level of assembler code.

10. The method according to claim 2, wherein amending the first code region replaces duplicate constant values originally present in the code with different constant expressions.

11. The method according to claim 2, wherein amending the first code region is performed at constants that are not present in the source code of the first software application but have been introduced by a compilation process of the source code of the first software application.

12. The method according to claim 2, wherein the amending first code region is applied to string literals.

13. The method according to claim 2, wherein the method comprises: adding at least one protection module to the first software application, wherein the protection module, when being executed, is at least part of a protection check carried out for the protected software application.

14. A computer program product executable on a computing module including a processor, the computer program comprises a software code to cause the processor to protect a first software application when the computer program product is executed by the processor, the instructions including instructions to cause the processor to:

add at least two check modules to the first software application, wherein a first check module of the at least two check modules, when being executed, checks at least a first part of the code of the protected software application loaded in the memory and carries out a predefined tamper response in case the first check module detects that the checked first part of the code was changed or ensures that the protected software application continues to function correctly in case the check module detects that the checked first part of the code was not changed and wherein a second check module of the at least two check modules, when being executed, checks at least a second part of the code of the protected software application loaded in the memory and carries out a predefined tamper response in case the second check module detects that the checked second part of the code was changed or ensures that the protected software application continues to function correctly in case the check module detects that the checked second part of the code was not changed wherein the first part of the code checked by the first check module includes the second check module such that when the first check module is executed the first check module verifies the second check module;

select a first code region of the first software application, said first code region provides a first functionality when being executed; and compile the first software application to provide the protected software application including amending the selected first code region of the first software application such that an amended first code region is generated to carry out access by the selected first code region to a part of code of the protected software application when the protected software application is loaded in the memory;

wherein the amended first code region, when being executed, still provides the first functionality but carries out an access to at least a part of the code of a protected software application loaded in the memory for providing the first functionality.

15. A device for protecting a first software application to generate a protecting software application to be executed on an execution platform having a memory in which code of the protection software application is loaded for execution, wherein the device adapted to protect the software application by:

adding check modules to the first software application, at least one check module overlapping with other check module, wherein the check module, when being executed, checks at least a part of the code of the protected software application loaded in the memory including code of at least one other check module; and carries out a predefined tamper response in case the check module detects that the checked code was changed or ensures that the protected software application continues to function correctly in case the check module detects that the checked code was not changed, selecting a first code region of the first software application, said first code region provides a first functionality when being executed, amending, during compilation, the selected first code region of the first software application such that an amended first code region is generated to carry out access by the selected first code region to a part of code of the protected software application when the protected software application is loaded in the memory and compiled to provide the protected software application, wherein the amended first code region, when being executed, still provides the first functionality but carries out an access to at least a part of the code of a protected software application loaded in the memory for providing the first functionality.

* * * * *